(12) United States Patent
Neubauer et al.

(10) Patent No.: US 9,403,577 B2
(45) Date of Patent: Aug. 2, 2016

(54) BOTTOM BRACKET UNIT FOR A BICYCLE

(75) Inventors: Markus Neubauer, Lichteneiche (DE); Stefan Gluck, Schweinfurt (DE); Frank Benkert, Waigolshausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 309 days.

(21) Appl. No.: 14/113,656

(22) PCT Filed: Apr. 17, 2012

(86) PCT No.: PCT/EP2012/056955
§ 371 (c)(1),
(2), (4) Date: Oct. 24, 2013

(87) PCT Pub. No.: WO2012/152540
PCT Pub. Date: Nov. 15, 2012

(65) Prior Publication Data
US 2014/0055772 A1    Feb. 27, 2014

(30) Foreign Application Priority Data

May 12, 2011 (DE) .......................... 10 2011 075 709

(51) Int. Cl.
*G01P 3/36* (2006.01)
*B62M 6/50* (2010.01)
*B62M 3/00* (2006.01)

(52) U.S. Cl.
CPC ............... *B62M 6/50* (2013.01); *B62M 3/003* (2013.01); *G01P 3/36* (2013.01); *Y10S 482/901* (2013.01)

(58) Field of Classification Search
CPC ...... B62M 3/003; G01P 3/36; Y10S 482/901; Y10S 482/902
USPC ............................................. 356/28
See application file for complete search history.

(56) References Cited

U.S. PATENT DOCUMENTS

| | | | | |
|---|---|---|---|---|
| 5,031,455 | A * | 7/1991 | Cline | A63B 24/00 73/379.01 |
| 5,202,627 | A * | 4/1993 | Sale | G01P 3/489 324/166 |
| 5,918,286 | A | 6/1999 | Smith et al. | |
| 6,701,793 | B2 * | 3/2004 | Wallin | G01L 3/102 73/862.333 |
| 2010/0299926 | A1 | 12/2010 | Stitzinger | |
| 2013/0306850 | A1* | 11/2013 | York | G01D 5/24476 250/231.14 |

FOREIGN PATENT DOCUMENTS

| | | |
|---|---|---|
| CH | 702983 | 12/2006 |
| CN | 2113467 | 8/1992 |

(Continued)

*Primary Examiner* — Mark Hellner
(74) *Attorney, Agent, or Firm* — Volpe and Koenig, P.C.

(57) ABSTRACT

A bottom bracket unit including a bottom bracket axle (1), at least one bearing (2, 3) that receives the bottom bracket axle (1) in a rotatable manner, and an optical detection unit (11), by which a rotational speed of the bottom bracket axle (1) can be detected. The optical detection unit (11) measures at least one signaling device (12) that is rotationally fixed to the bottom bracket axle (1). The aim of the invention is to provide a bottom bracket unit that can also detect the rotational direction of the bottom bracket axle in addition to the rotational speed of the axle. This is achieved in that the optical detection unit (11) has two optical sensors (17), with one of these sensors (17) providing a signal that is phase-shifted with respect to the other sensor (24) having a fixed phase difference, in particular with a phase difference of 90°.

20 Claims, 4 Drawing Sheets

(56) References Cited

FOREIGN PATENT DOCUMENTS

| CN | 1162990 | 10/1997 |
| CN | 201173787 | 12/2008 |
| DE | 4320834 | 4/1994 |
| DE | 19609981 | 9/1997 |
| DE | 102008050235 | 4/2010 |
| DE | 102009021541 | 11/2010 |
| EP | 0976649 | 2/2000 |

* cited by examiner

BOTTOM BRACKET UNIT FOR A BICYCLE

FIELD OF THE INVENTION

Background

The invention relates to a bottom bracket unit and also to a bicycle, in particular, an electric bicycle (e-bike), pedelec, or ergometer, with such a bottom bracket unit.

From the prior art, bicycles, in particular e-bikes, pedelecs, or ergometers, are known that can detect the torques introduced into the bottom bracket axle by the operator via the cranks. In order to determine the power of the operator, for example, also in order to be able to control an electric auxiliary drive for the bicycle, in addition to detecting the torque, the rotational speed of the bottom bracket axle must also be detected.

DE 10 2009 021 541 A1 describes a bottom bracket unit with a bottom bracket axle that is supported by means of two bearings so that it can rotate, wherein a bearing cage is locked in rotation on the surface of the body of the bottom bracket axle and wherein the connecting pieces of the bearing cage are detected by an optical sensor, in order to determine the rotational speed of the bottom bracket axle. The bearing cage is here constructed as the signaling device of the sensor.

DE 10 2008 050 235 A1 describes a bottom bracket unit with a bottom bracket axle that is held by means of two bearings so that it can rotate, wherein a permanent magnetic field is impressed in a magnetic field section of the body of the bottom bracket unit so that, if there is a torque in the bottom bracket axle, a magnetic field that can be detected outside of the body is generated due to the magnetostrictive effect. Here, in the torque-free state of the bottom bracket axle, the magnetic field lines are essentially concentric around the rotational axis of the bottom bracket axle. If torque is applied in the bottom bracket axle, a magnetic field component that is no longer tangential is generated due to the magnetostrictive effect, so that a magnetic field outside of the bottom bracket axle can be detected. The bottom bracket unit further comprises a magnetic sensor that detects magnetic fields when there is a torque. The bottom bracket unit also comprises an optical detection unit by means of which the rotational speed of the bottom bracket axle can be detected, wherein the optical detection unit measures at least one signaling device locked in rotation on the bottom bracket axle, wherein a structuring of the surface of the bottom bracket axle is provided as the signaling device. In this way it is disadvantageous that the rotational speed of the bottom bracket axle can indeed be detected, but not the direction of rotation.

SUMMARY

The object of the invention is to provide a bottom bracket unit that can detect, in addition to the rotational speed, also the direction of rotation of the bottom bracket axle.

This objective is met according to the invention for the bottom bracket unit noted above in that the optical detection unit comprises two optical sensors, wherein one of the two sensors delivers a signal that is phase-shifted relative to the other sensor with a fixed phase difference, in particular, with a phase difference of 90°.

Due to the phase difference, it can be determined which of the two optical sensors delivers the signal that arrives earlier chronologically, so that the direction of rotation can be determined. In the event of a stationary bottom bracket axle, the direction of rotation that the bottom bracket axle had before the standstill can also be determined if the signals of the two sensors are stored directly before the occurrence of the standstill.

Advantageously it is provided that the two optical sensors measure a single, common signaling device. The signaling device can comprise, for example, a marking that is arranged on the bottom bracket axle, wherein the sensors are offset in the circumferential direction of the bottom bracket axle. The signaling device can comprise, as an alternative or addition, a disk locked in rotation with the bottom bracket axle, wherein the two optical sensors can be arranged to both sides of the disk, offset in the circumferential direction of the disk. In two cases discussed as examples, installation space can be spared in the axial direction, that is, in the direction of the extent of the bottom bracket axle or in the direction of the rotational axis of the bottom bracket axle.

Advantageously it is provided that the first optical sensor measures a first signaling device and the second optical sensor has a second signaling device, wherein the two signaling devices are arranged rotated relative to each other by a fixed phase difference. In this case, the two optical sensors do not necessarily have to be spaced apart in the circumferential direction, but spaced apart, for example, in the axial direction, so that installation space can be spared in the radial direction with respect to the rotational axis of the bottom bracket axle.

Advantageously it is provided that the signaling device comprises a marking. The marking is formed all around in the direction of rotation of the bottom bracket axle and supplies, for the case of two optical sensors, a regular, for example, periodic sequence of signals.

Advantageously it is provided that, with respect to the marking, the marking is formed on a disk that is locked in rotation with the bottom bracket axle and extends essentially perpendicular to the rotational axis of the bottom bracket axle. The disk takes up only a small installation space in the axial and radial directions of the bottom bracket axle and provides an additional degree of freedom with respect to the arrangement of the two optical sensors.

For example, it can be advantageously provided that the marking is arranged on a bearing ring of the bearing, in particular, on an end face of the bearing ring of the bearing. The marking can be arranged directly on the end face of the bearing ring or on a disk, wherein the disk is arranged on the bearing ring, for example, on an end face of the bearing ring. The marking and the optical sensors can be spaced apart from the magnetic field section of the body of the bottom bracket axle, so that close to the bearing, existing installation space can be used for detecting the rotational speed and the direction of rotation.

With respect to the arrangement of the marking on a bearing ring of the bearing of the bottom bracket unit, it is advantageously provided that the marking is arranged on a seal that is locked in rotation with the bearing ring of the bearing. The seal has a radial distance from the surface of the body of the bottom bracket axle, so that the two optical sensors can be placed, in many cases, at unused locations of the bottom bracket unit.

Advantageously it is provided that the marking is arranged on the surface of the body of the bottom bracket axle. In particular, it is advantageously provided that a permanent magnetic field is impressed in a magnetic field section of the body of the bottom bracket axle, so that, when there is a torque in the bottom bracket axle, a magnetic field that can be detected outside of the body is generated, wherein the bottom bracket unit comprises a magnetic sensor that detects the magnetic field produced in the presence of the torque and the marking is arranged on the surface of the body of the bottom bracket axle, in particular, on the magnetic field section. Here, the marking takes up no additional installation space in the axial or radial directions with respect to the rotational axis of the bottom bracket axle. The optical sensors can be arranged close to the magnetic sensor that is intended to detect the magnetic field generated due to the torque in the bottom bracket axle. If, in particular, two magnetic field sections that are spaced apart in the axial direction and that are each detected by a magnetic sensor are provided on the bottom bracket axle, the two optical sensors are arranged, for example, axially between the two magnetic sensors, without constraining at least four sensors to a tight space.

Advantageously it is provided that the marking is formed by a sequence of peripheral sections in the circumferential direction with different coatings, colors, paints, or surface roughness.

As an alternative or addition, it is advantageously provided that the marking is formed by a tube or film element. The tube or film element can have, for example, the coating, color, paint, or surface roughness different in some sections, so that the body of the bottom bracket axle does not need processing and the marking can be applied easily by applying the hose or film element, for example, by shrink-fitting a heat-shrink tube or by attaching a rubber tube. The tube or film element can even form the marking, for example, by leaving out sections of the tube that are measured and detected by the optical sensors.

Advantageously it is provided that the signaling device comprises a disk element with teeth on the periphery in the circumferential direction, wherein the teeth of the toothing form a part of the marking. On the periphery of the disk element there are sections where material is left out and the teeth of the toothing are formed between these sections. The teeth form a part of the marking that can be measured by one or two optical sensors, for example, in a light barrier arrangement. It can be provided, in particular, that the marking is formed by the teeth and the gaps provided between two adjacent teeth.

Advantageously it is provided that the disk element is formed as a cut of an axial needle bearing cage. The teeth of the toothing are here formed by sections of the connecting pieces of the axial needle bearing cage that are left standing in some sections when the cage is cut.

Advantageously it is provided that the pitch ratio of the marking is constant for each reference circle. For a radial displacement, that is, for a change in the radius of the reference circle, when the bottom bracket unit is in operation, the pitch ratio stays constant, that is, the ratio of the extent in the circumferential direction of the different sections of the marking stays constant, so that a radial offset of the optical detection unit remains unchanged relative to the bottom bracket axle, in particular, the duty cycle, that is, the quotient of the period lengths of successive signals, remains unchanged for each of the two optical sensors.

Advantageously it is provided that at least one of the two optical sensors is formed as a reflection sensor. The sensor here comprises a light source and a light receiver that are arranged on the same side with respect to the marking. In an especially preferred way it is provided that both optical sensors are formed as reflection sensors.

Advantageously it is provided that at least one of the two optical sensors is formed as a transmission sensor, in particular, as a light barrier. In this case, the sensor has a light source and a light receiver that are arranged on different sides of the marking. Here, the marking must be transmissive with respect to light in some sections, in particular, at least transparent, so that the marking is formed, for example, by toothing with a sequence of teeth and gaps in the circumferential direction.

Additional advantages and features result from the dependent claims and also from the following description of preferred embodiments of the invention.

BRIEF DESCRIPTION OF THE DRAWINGS

The invention is described and explained in more detail below with reference to the accompanying drawings.

DETAILED DESCRIPTION OF THE PREFERRED EMBODIMENTS

Figure 1:
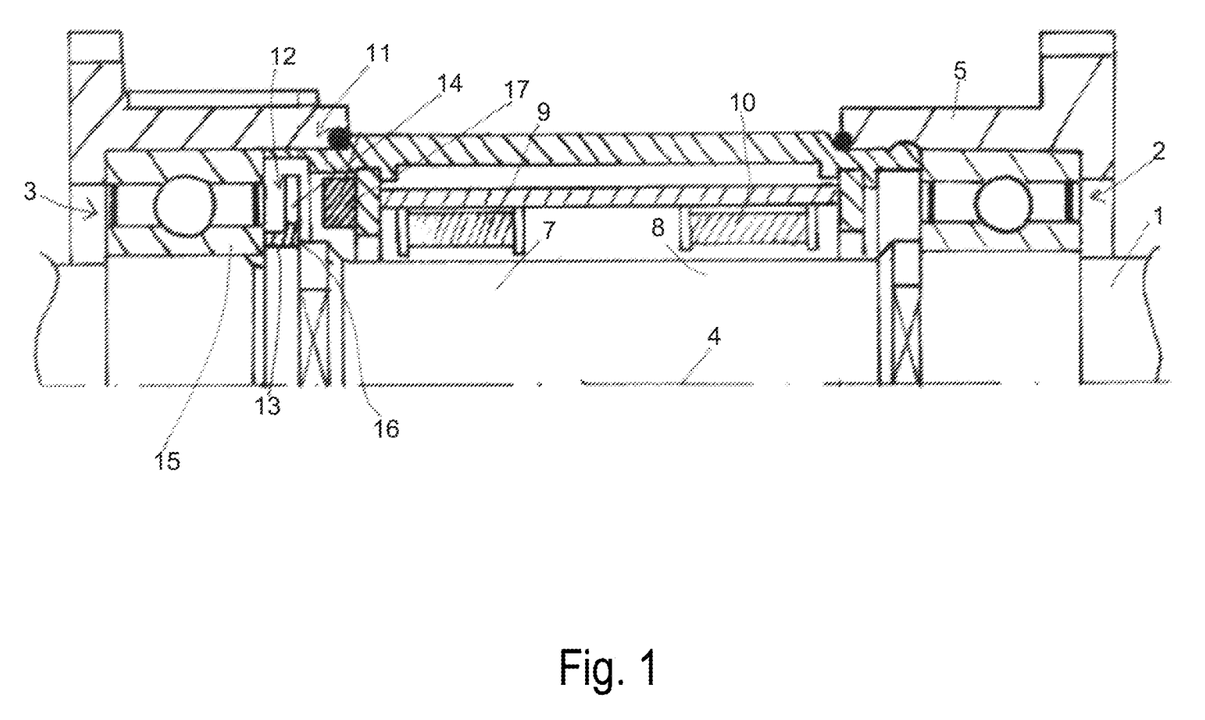
FIG. 1 shows a partially sectioned view of a first embodiment of a bottom bracket unit according to the invention.

FIG. 1 shows a bottom bracket unit that comprises a bottom bracket axle 1 supported by means of two bearings 2, 3 so that it can rotate about a rotational axis 4 relative to a housing 5.

In the metallic body of the bottom bracket axle 1, in the region of a first magnetic field section 7, a first permanent magnetic field is impressed and, in the region of a second magnetic field section 8, a second permanent magnetic field is impressed. If there is no torque in the bottom bracket axle 1, the two permanent magnetic fields revolve around the rotational axis 4 concentrically, but in opposite directions, so that only stray magnetic fields are detected outside of the bottom bracket axle 1. In the bottom bracket axle 1, if a torque is applied, for example, by an operator, and this torque introduces a force into the bottom bracket axle 1 by means of cranks, external magnetic fields appear in both magnetic field sections 7, 8 due to the magnetostrictive effect. These external magnetic fields can have different magnitudes and directions and are a measure for the torque present in the bottom bracket axle 1. The external magnetic fields are detected by two magnetic sensors 9, 10 that are formed as Hall effect sensors and are attached indirectly to the housing 5 relative to which the bottom bracket axle 1 is supported so that it can rotate.

The bottom bracket unit further comprises an optical detection unit 11, by means of which the rotational speed of the bottom bracket axle 1 can be detected. The optical detection unit 11 here measures a signaling device 12 that is locked in rotation with the bottom bracket axle 1 and has an axial section 13 and a radial section 14 extending perpendicular to the rotational axis 4 of the bottom bracket axle 1. The axial section 13 of the signaling device 12 is attached tensioned by an inner bearing ring 15 of the bearing 3 against a rim 16 on the body of the bottom bracket axle 1, so that the signaling device 12 is locked in rotation with the bottom bracket axle 1.

The optical detection unit 11 comprises two optical sensors, one of which is identified with the reference symbol 17 and is arranged in the plane of the illustration of FIG. 1. The second optical sensor is arranged offset in the circumferential direction relative to the first optical sensor 17 outside of the plane of the illustration of FIG. 1. The first optical sensor 17 and the second optical sensor measure together the signaling device 12 as a single, joint signaling device. The two optical sensors are arranged on a common circuit board indirectly on the housing 5.

Figure 1A:
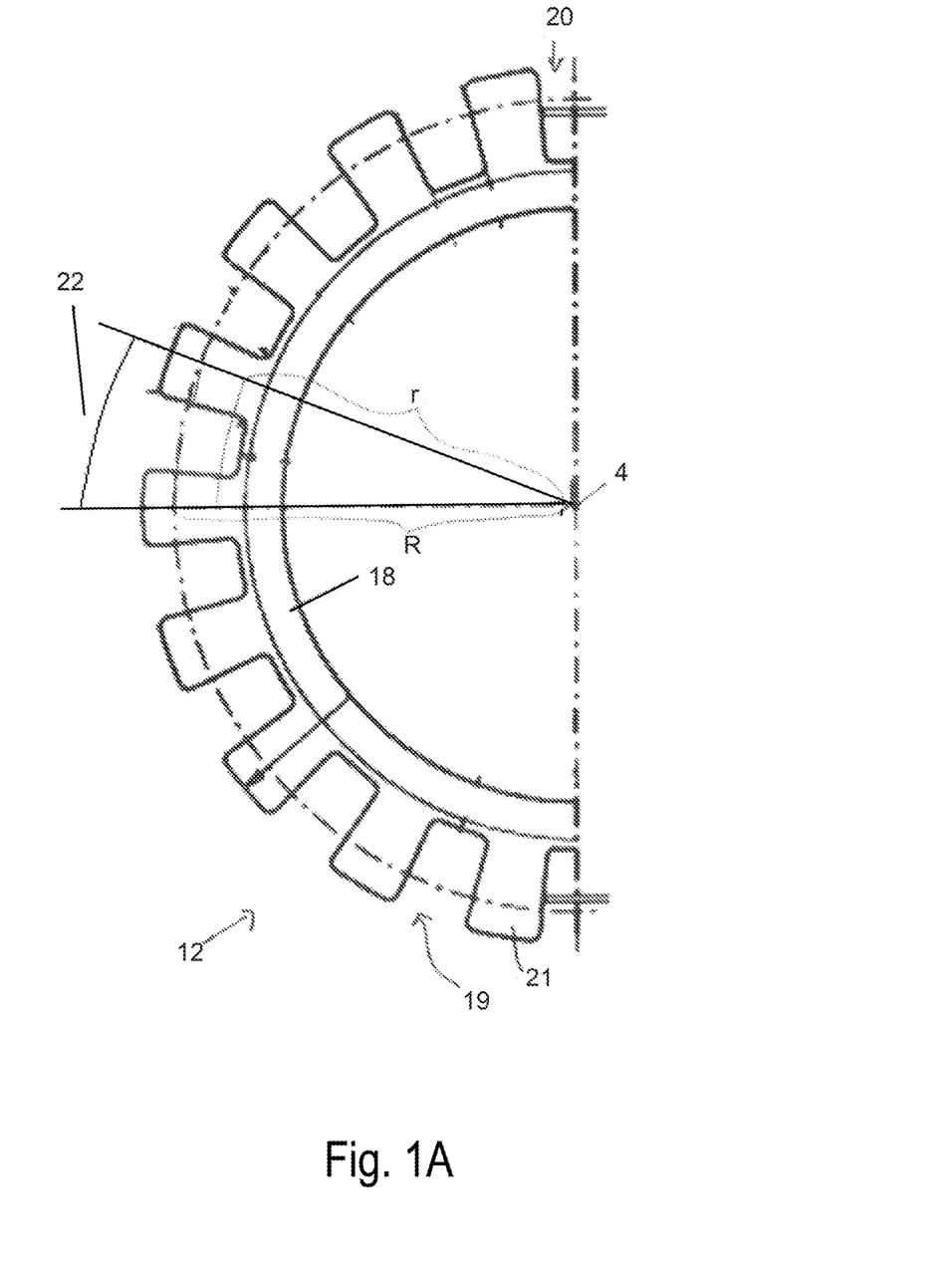
FIG. 1a shows a top view of a part of the first embodiment shown in FIG. 1.

The signaling device 12 is shown in FIG. 1*a* in a top view along the rotational axis 4. The radial section 14 of the signaling device 12 is formed as a disk element 18 toothed on the outer periphery in the circumferential direction, wherein the teeth of the toothing form a first part of a marking 19 and the gaps enclosed between adjacent teeth form the other part of the marking 19. The disk element 18 is formed as a section from an axial needle bearing cage. The first optical sensor 17 is shown arranged in the illustration of FIG. 1 so that it measures the gaps identified with the reference symbol 20. The second optical sensor is arranged offset relative to the first optical sensor 17 in the circumferential direction so that it measures one of the teeth, for example, the tooth identified with the reference symbol 21.

The two optical sensors are each formed as reflection sensors, wherein the reflection sensor comprises a light source, for example, for infrared radiation, and a light receiver that is sensitive to infrared radiation, and wherein the light receiver detects the IR light from the light source reflected at the marking 19. At each of the teeth and gaps of the marking 19, a reflection occurs with a different coefficient of reflection. When the signaling device 12 rotates with the bottom bracket axle 1, each of the optical sensors 17 therefore supplies an essentially square-shaped, periodic signal, wherein one of the two sensors, for example, the first sensor 17, supplies a signal that is phase shifted with respect to the other sensor, namely the second sensor not shown in the figure, with a fixed phase difference, namely with a phase difference of 90° in the embodiment shown.

From the two phase-shifted measurement values of the two offset optical sensors, the direction of rotation can be determined with which the bottom bracket axle 1 rotates about the rotational axis 4.

To reach the phase offset of 90°, it is already sufficient if the two optical sensors are arranged offset by half the pitch, that is, half the distance of the centers of two adjacent teeth measured in the circumferential direction or by (n+0.5) times this pitch (n: whole number). A whole pitch (n=1) is shown in FIG. 1*a* as angle 22.

The marking 19 is formed in the illustration of FIG. 1*a* with the teeth and gaps so that the pitch ratio of the marking 19 is constant for every reference circle. For the reference circle with the greater radius R, the pitch ratio, that is, the quotient from the extent of the tooth to the extent of the gap, each measured in the circumferential direction, is the same as for the reference circle with the smaller radius r. Here, the duty cycle remains constant for the essentially square signals of each of the two optical sensors, even if the signaling device 12 with the marking 19 is to be arranged approximately eccentric to the rotational axis 4.

In the following description of the two different embodiments, identical reference symbols designate features that are identical or comparable in their technical action. In particular, the differences to the first embodiment shown in FIG. 1 and FIG. 1*a* will be emphasized.

Figure 2:
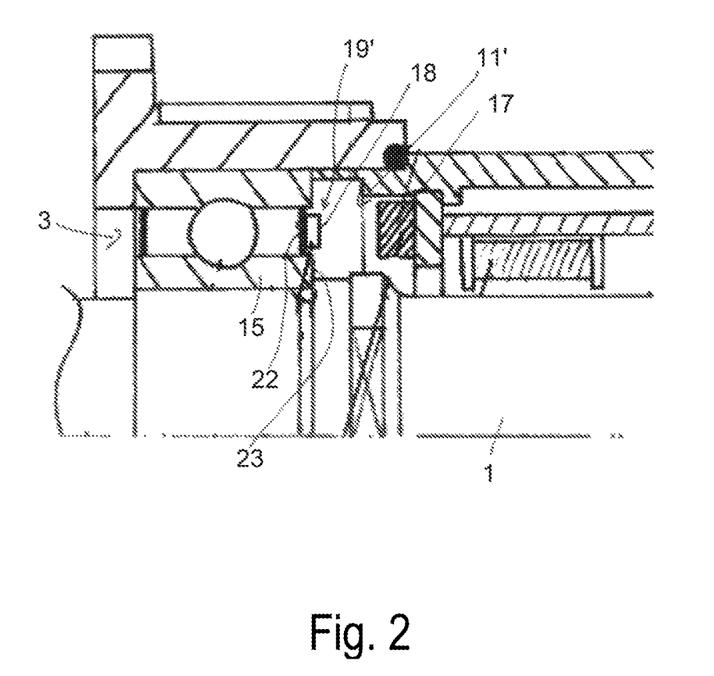
FIG. 2 shows a cut-out of a partially sectioned view of a second embodiment of a bottom bracket unit according to the invention.

FIG. 2 shows, in a cut-out view, a bottom bracket unit with a bearing 3 that has a seal 22 that is locked in rotation on the inner bearing ring 15 and thus on the bottom bracket axle 1. A marking 19' that is formed by a circular ring-shaped disk element 18 with teeth and gaps between adjacent teeth is provided on the seal 22. An optical detection unit 11' comprises two optical sensors. The first is identified with the reference symbol 17 and the second sensor, offset in the circumferential direction of the bottom bracket axle 1, lies outside of the plane of the paper.

It is understood that, in a modified construction, the marking 19' can also be provided on one of the bearing rings of the bearing 3, for example, on an end face 23 of the inner bearing ring 15, in particular, the circular ring-shaped disk element 18 can be mounted directly on the end face 23 of the inner bearing ring 15.

For the previously described first two embodiments, it was provided that the marking 19, 19' is formed on a disk that is locked in rotation with the bottom bracket axle (1) and extends essentially perpendicular to the axis of the bottom bracket axle (1). Here, in the first embodiment (FIG. 1), the disk is formed as a disk element 18 that was constructed as a radial section 14 of the signaling device 12 and, in the second embodiment (FIG. 2), as a circular ring-shaped disk element 18 that is arranged directly on the seal 22 of the bearing 3. In both embodiments, the disk element 18 was provided on the periphery with a toothing in the circumferential direction. It is understood that a toothing on the periphery can be eliminated so that the disk has a circular-shaped circumferential outline, wherein the marking is deposited on the disk, such that the marking is formed by a sequence of sections in the circumferential direction with different coatings, colors, paint, or surface roughness (e.g., by a targeted, local etching process).

Figure 3:
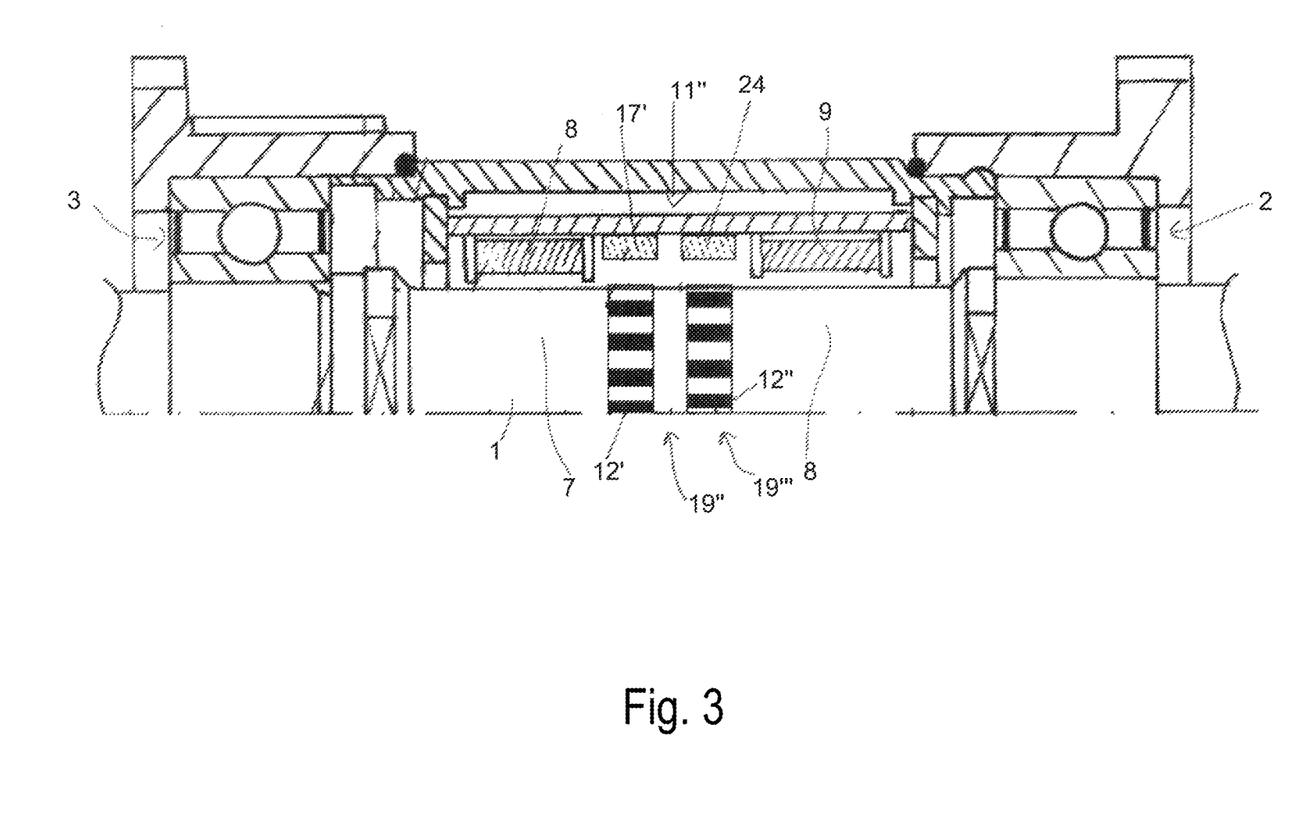
FIG. 3 shows a partially sectioned view of a third embodiment of a bottom bracket unit according to the invention.

FIG. 3 shows a bottom bracket unit with a bottom bracket axle 1, two bearings 2, 3 that hold the bottom bracket axle 1 so that it can rotate, wherein a permanent magnetic field is impressed in two magnetic field sections 7, 8 of the body of the bottom bracket axle 1, so that when there is a torque in the bottom bracket axle 1, a magnetic field that can be detected outside of the body is generated. Two magnetic sensors 8, 9 that are formed as Hall effect sensors detect the magnetic field that is produced outside of the bottom bracket axle 1 when there is torque. The bottom bracket unit further comprises an optical detection unit 11'', by means of which the rotational speed of the bottom bracket axle 1 can be detected, wherein the optical detection unit 11'' measures two signaling devices 12', 12'' that are locked in rotation with the bottom bracket axle 1. The rotationally locked signaling devices 12', 12'' are locked in rotation on the bottom bracket axle 1 and form a marking 19'', 19''' for the two optical sensors 17', 24. The two optical sensors 17', 24 of the optical detection unit 11' are spaced apart axially, that is, in the direction of the rotational axis 4 of the bottom bracket axle 1. They are, however, not spaced apart in the circumferential direction of the bottom bracket axle 1, but instead arranged directly adjacent.

The marking 19' is arranged on the surface of the body of the bottom bracket axle 1, namely on the magnetic field section 7, 8, especially on the end sections of the magnetic field sections 7, 8, so that also the two optical sensors 17', 24 are arranged between the two magnetic sensors 8, 9. In particular, it is provided that the marking 19'', 19''' is formed by a sequence of sections in the circumferential direction with different coatings, colors, paint, or surface roughness; alternatively, it can be provided that the marking 19'', 19''' is formed by a tubular or film element, wherein the tubular or film element has the coating, color, paint, or surface roughness of the marking itself and is mounted on the surface of the body of the bottom bracket axle 1, for example, as a heat-shrink tube or rubber tube with the marking on the outer surface.

In the third embodiment it is provided, in particular, that the two signaling devices 12', 12'' are arranged rotated relative to each other by a fixed phase difference, so that each of the two optical sensors 17', 24 measures a separate signaling device 12', 12'', wherein the markings 19'', 19''' are arranged as a sequence of bright and dark sections of equal width in the circumferential direction of the bottom bracket axle 1, but phase offset by 90° in the circumferential direction of the bottom bracket axle 1.

In the three embodiments described above, the optical sensors 17, 17', and 17" were each formed as reflection sensors in which the light source and the light receiver were arranged on the same side with respect to the measured signaling devices 12, 12', 12". It is understood that the optical sensors can also be formed as transmission sensors, in particular, as light barriers, especially in a toothed disk element 18 as a signaling device 12, wherein, in this case, the light source is arranged on one side of the disk element 18 and the light receiver is arranged on the other side of the disk element 18. The teeth 21 then interrupt the light flux through the gaps 22 between the light source and the light receiver.

The invention was described and explained above with reference to three embodiments in which the first optical sensor 17, 17', and 17" and the second optical sensor 24 each has a separate light source and a separate light receiver. It is understood that the two optical sensors can also have a common light source that generates two sub-beams by means of a beam splitter, wherein the two sub-beams are directed onto different sections of the signaling device or onto two different signaling devices. Likewise it can be provided that the first sensor and the second sensor have a common light receiver, for example, an optically active element that extends in two dimensions and detects the two sub-beams at different positions.

LIST OF REFERENCE SYMBOLS

1 Bottom bracket axle
2 Bearing
3 Bearing
4 Rotational axis
5 Housing
7 First magnetic field section
8 Second magnetic field section
9 First magnetic sensor
10 Second magnetic sensor
11, 11', 11" Optical detection unit
12, 12', 12" Signaling device
13 Axial section
14 Radial section
15 Inner bearing ring
16 Rim
17, 17' First optical sensor
18, 18' Disk element
19, 19', 19", 19''' Marking
20 Gap
21 Tooth
22 Seal
23 End face
24 Second optical sensor

The invention claimed is:

1. A bottom bracket unit comprising
a housing;
a bottom bracket axle rotatably mounted in the housing,
at least one bearing holding the bottom bracket axle for rotation, and
an optical detection unit by which a rotational speed of the bottom bracket axle is detected, the optical detection unit detects at least one signaling device that is locked in rotation with the bottom bracket axle,
the optical detection unit comprises two optical sensors, wherein one of the two sensors delivers a signal that is phase-shifted with respect to the other sensor with a fixed phase difference, and
wherein the at least one bearing, the at least one signaling device, and the two optical sensors are mounted in the housing.

2. The bottom bracket unit according to claim 1, wherein the two optical sensors detect a single, common signaling device.

3. The bottom bracket unit according to claim 1, wherein the first optical sensor detects a first signaling device and the second optical sensor detects a second signaling device, and the two signaling devices are arranged rotated relative to each other by a fixed phase difference.

4. The bottom bracket unit according to claim 1, wherein the signaling device comprises a marking.

5. The bottom bracket unit according to claim 4, wherein the marking is formed on a disk that is locked in rotation with the bottom bracket axle and extends essentially perpendicular to an axis of the bottom bracket axle.

6. The bottom bracket unit according to claim 4, wherein the marking is arranged on a bearing ring of the bearing.

7. The bottom bracket unit according to claim 4, wherein the marking is arranged on a seal that is locked in rotation with the bearing ring of the bearing.

8. The bottom bracket unit according to claim 4, wherein in a magnetic field section of the body of the bottom bracket axle, a permanent magnetic field is impressed so that a magnetic field that can be detected outside of the body is generated when there is a torque in the bottom bracket axle, the bottom bracket unit comprises a magnetic sensor that detects the magnetic field that is generated when a torque is applied, and the marking is arranged on a surface of the body of the bottom bracket axle.

9. The bottom bracket unit according to claim 4, wherein the marking is formed by a sequence of sections in a circumferential direction with different coatings, colors, paint, or surface roughness.

10. The bottom bracket unit according to claim 4, wherein the marking is formed by a tubular or film element.

11. A bottom bracket unit comprising
a bottom bracket axle rotatably mounted in the housing,
at least one bearing holding the bottom bracket axle for rotation, and
an optical detection unit by which a rotational speed of the bottom bracket axle is detected, the optical detection unit detects at least one signaling device that is locked in rotation with the bottom bracket axle,
the optical detection unit comprises two optical sensors, wherein one of the two sensors delivers a signal that is phase-shifted with respect to the other sensor with a fixed phase difference,
wherein the signaling device comprises a disk element that is toothed on a periphery in a circumferential direction, and teeth of the toothing form a part of a marking.

12. The bottom bracket unit according to claim 11, wherein the disk element is formed as a blank of an axial needle bearing cage.

13. The bottom bracket unit according to claim 11, wherein a pitch ratio of the marking is constant for each reference circle.

14. The bottom bracket unit according to claim 1, wherein at least one of the two optical sensors is a reflection sensor.

15. The bottom bracket unit according to claim 1, wherein at least one of the two optical sensors is a transmission sensor.

16. A bicycle comprising a bottom bracket unit according to claim 1.

17. The bottom bracket unit according to claim 1, wherein the phase difference is 90°.

18. The bottom bracket unit according to claim 6, wherein the marking is located on an end face of the bearing ring.

19. The bottom bracket unit according to claim 8, wherein the marking is arranged on the magnetic field section of the body of the bottom bracket axle.

20. The bottom bracket unit according to claim 1, further comprising a torque detecting unit including at least one magnetic sensor mounted in the housing.

* * * * *